United States Patent
Ferlitsch

(10) Patent No.: US 8,405,840 B2
(45) Date of Patent: Mar. 26, 2013

(54) SYSTEMS AND METHODS FOR MINIMIZING RE-IMAGING PROCEDURES FOR AN IMAGING DEVICE

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1132 days.

(21) Appl. No.: 12/338,729

(22) Filed: Dec. 18, 2008

(65) Prior Publication Data

US 2010/0157344 A1 Jun. 24, 2010

(51) Int. Cl.
*G06F 3/12* (2006.01)

(52) U.S. Cl. .................. 358/1.13; 358/1.15; 358/1.9

(58) Field of Classification Search .................. None
See application file for complete search history.

(56) References Cited

U.S. PATENT DOCUMENTS

| | | | |
|---|---|---|---|
| 5,105,225 A | 4/1992 | Honjo et al. | |
| 5,122,872 A | 6/1992 | Nagano | |
| 5,734,759 A | 3/1998 | Hirota et al. | |
| 5,901,253 A | 5/1999 | Tretter | |
| 5,949,453 A | 9/1999 | Harris et al. | |
| 6,310,984 B2 | 10/2001 | Sansom-Wai et al. | |
| 6,351,324 B1 | 2/2002 | Flint | |
| 6,377,703 B1 | 4/2002 | Yeung | |
| 6,470,098 B2 | 10/2002 | Yamaguchi et al. | |
| 6,535,914 B1 | 3/2003 | Pearson et al. | |
| 6,633,414 B1 * | 10/2003 | Matsuda et al. | 358/474 |
| 6,987,582 B1 * | 1/2006 | Atsumi | 358/1.6 |
| 7,324,243 B2 | 1/2008 | Cheng | |
| 7,375,861 B2 | 5/2008 | Lebo et al. | |
| 7,388,691 B2 | 6/2008 | Wang | |
| 2004/0165233 A1 | 8/2004 | Wang | |
| 2005/0094168 A1 | 5/2005 | Cheng | |
| 2006/0227375 A1 | 10/2006 | Kamimura | |

FOREIGN PATENT DOCUMENTS

| | | |
|---|---|---|
| GB | 2284319 | 5/1995 |
| JP | 2001136317 | 5/2001 |
| JP | 2005064944 | 3/2005 |
| JP | 2007311862 | 11/2007 |

\* cited by examiner

*Primary Examiner* — Mark K Zimmerman
*Assistant Examiner* — Lennin Rodriguezgonzalez
(74) *Attorney, Agent, or Firm* — Austin Rapp & Hardman

(57) ABSTRACT

A method for minimizing re-imaging procedures for an imaging device is disclosed. A first set of imaging instructions for a hard copy of a document is received at an imaging device. The hard copy of the document is scanned in accordance with the first set of imaging instructions to create image data. The image data is retained in memory at an identified location until a purging event occurs. A second set of imaging instructions is received at the imaging device. It is then determined whether the hard copy of the document has been removed from the processing path of the imaging device since the scanning occurred using at least one sensor. If the hard copy of the document has not been removed, imaging output is produced in accordance with the second set of instructions using the image data without rescanning a hard copy of the document.

5 Claims, 9 Drawing Sheets

SYSTEMS AND METHODS FOR MINIMIZING RE-IMAGING PROCEDURES FOR AN IMAGING DEVICE

TECHNICAL FIELD

The present invention relates generally to electronic devices and computer-related technology. More specifically, the present invention relates to systems and methods for minimizing re-imaging procedures for an imaging device.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may comprise a one-chip computer, such as a microcontroller, a one-board type of computer, such as a controller, or a typical desktop computer, such as an IBM-PC compatible computer, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers may comprise a portion of an imaging device. Imaging devices include, but are not limited to, copiers, multi-function peripherals (MFPs), a fax machine, a scanner, a smart digital whiteboard, digital camera scanner, etc.

Different kinds of computer software facilitate the use of imaging devices. A computer or computing device that will be used to print the materials or to obtain information from an imaging device typically has one or more pieces of software running on the computer that enable it to send the information to an imaging device or to receive information from the imaging device. A computing device may utilize a network to communicate with the imaging device.

Imaging devices, computing devices, and other electronic devices all use power for operation. In some situations, it may be desirable to save power, while at other times the use of power may not be a concern. Benefits may be realized by providing improved systems and methods for controlling power usage on a device and to minimize unnecessary operation of the device or portions of the device.

DETAILED DESCRIPTION

Figure 1:
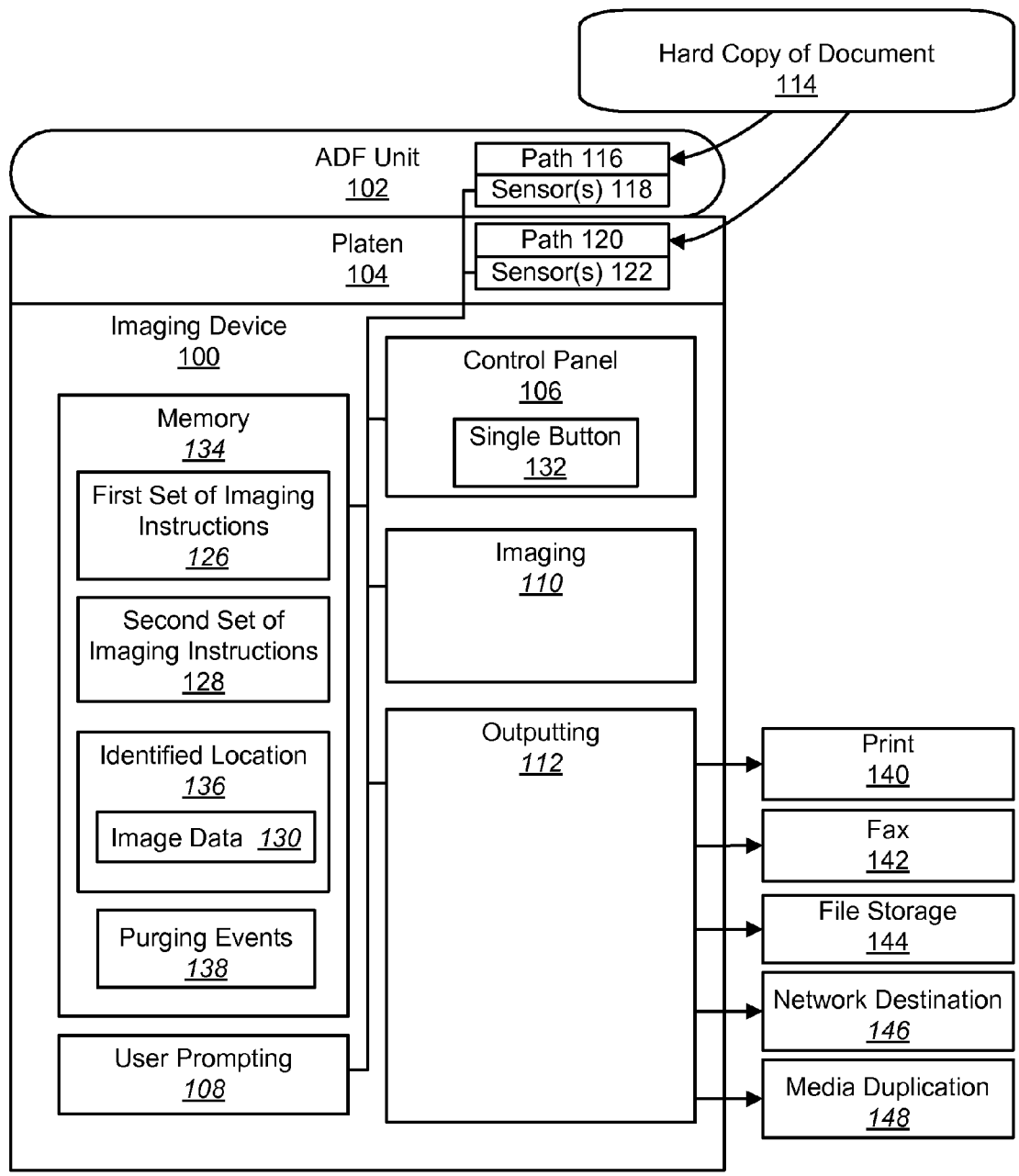
FIG. 1 is a flow diagram illustrating one embodiment of an imaging device for minimizing re-imaging procedures.

A method for minimizing re-imaging procedures for an imaging device is disclosed. A first set of imaging instructions is received for a hard copy of a document at an imaging device. The hard copy of the document is scanned in accordance with the first set of imaging instructions to create image data. The image data is retained in memory at an identified location until a purging event occurs. A second set of imaging instructions is received at the imaging device. It is determined whether the hard copy of the document has been removed from a hard copy processing path of the imaging device since the scanning occurred using at least one sensor. Imaging output is produced in accordance with the second set of instructions using the image data without rescanning the hard copy of the document if the hard copy of the document has not been removed from the hard copy processing path.

The second set of imaging instructions may be generated in response to activating a single button. It may be determined whether the second set of imaging instructions requires information not present in the image data. The hard copy of the document may be rescanned in accordance with the second set of imaging instructions if the second set of imaging instructions requires image information not present in the image data.

Output may be created based on the first set of imaging instructions. A user may be prompted to indicate whether the image data should be used to process the second set of instructions.

The user may be prompted to indicate whether the image data should be used to process the second set of instructions only if it is determined that the hard copy of the document has not been removed from the hard copy processing path of the imaging device since the scanning occurred. In addition, the user may be prompted to indicate whether the image data should be used to process the second set of instructions only if it is determined that the hard copy of the document has not been removed from the hard copy processing path of the imaging device since the scanning occurred and that the second set of imaging instructions does not require information not present in the imaging data.

The hard copy processing path may include an automatic document feeding path. The image data may be saved at a specified location in response to the first set of imaging instructions. The image data may include data necessary to output an image of the hard copy of the document.

An imaging device for minimizing re-imaging procedures is disclosed. The imaging device includes a processor, a fuser and memory in electronic communication with the processor. Executable instructions are stored in the memory. A first set of imaging instructions for a hard copy of a document is received at an imaging device. The hard copy of the document is scanned in accordance with the first set of imaging instructions to create image data. The image data is retained in memory at an identified location until a purging event occurs. A second set of imaging instructions is received at the imaging device. It is determined whether the hard copy of the document has been removed from a hard copy processing path of the imaging device since the scanning occurred using at least one sensor. Imaging output is produced in accordance with the second set of instructions using the image data without rescanning the hard copy of the document if the hard copy of the document has not been removed.

A computer-readable medium providing for minimizing re-imaging procedures for an imaging device is disclosed. The computer-readable medium includes executable instructions. A first set of imaging instructions for a hard copy of a document is received at an imaging device. The hard copy of the document is scanned in accordance with the first set of imaging instructions to create image data. The image data is retained in memory at an identified location until a purging event occurs. A second set of imaging instructions is received at the imaging device. It is determined whether the hard copy of the document has been removed from a hard copy processing path of the imaging device since the scanning occurred using a sensor. Imaging output is produced in accordance with the second set of instructions using the image data without rescanning the hard copy of the document if the hard copy of the document has not been removed.

Several exemplary configurations are now described with reference to the Figures. This detailed description of several configurations, as illustrated in the Figures, is not intended to limit the scope of the claims.

The word "exemplary" is used exclusively herein to mean "serving as an example, instance, or illustration." Any configuration described as "exemplary" is not necessarily to be construed as preferred or advantageous over other configurations.

The disclosed systems and methods solve the problem of efficiently re-outputting a scan or copy job of the same document, when, in one embodiment, the document has not been removed from the platen or automatic document feeder (ADF).

In one embodiment, when a user first copies (or scans to send) a document, the imaging device (e.g., a scanner, copier, or multi-function peripheral (MFP)) scans the document. The scanned information is then processed into scanned image data. The scanned image data is then sent to a print engine or a network destination for outputting. Once the outputting operation is complete, the scanned image data is purged.

If the user decides to repeat the operation (e.g., a second copy), the copier will repeat the entire operation as described. This procedure has a number of limitations in that, for example:

There is no detection that a repeated operation is to be performed on the same document;
Energizing the scanner beam consumes energy; and
This repeating process shortens the life of the scanner beam.

The exemplary operating environment for the disclosed systems and methods include one or more imaging devices (e.g., MFP devices). Each imaging device has at least the capability to scan a hard copy document. The scanning operation may be used for one or more outputting operations, such as:

1. Copying;
2. Faxing;
3. Filing; and
4. Sending to Destination.

The imaging device also has a sensor for detecting whether the hard copy has been removed from the device after executing a scanning operation.

When an image or images are scanned from the platen or ADF, a copy of the generated image data is retained temporarily in the imaging device. When a user subsequently inputs a second set of imaging instructions (e.g., pressing the COPY/SCAN button again), the imaging device checks whether the sensor has detected that the previous original was removed.

If not (e.g., the original is still on the platen or ADF), the imaging device checks if the temporary copy of the previous scanned data has been retained, and that the scanning options have not changed in a way that would require rescanning (e.g., if the second set of imaging instructions require a higher resolution or a color image). If the data is still retained, and no scanning options have changed in a way that would require rescanning, the imaging device "reuses" the temporarily saved scanned image data instead of repeating the scan.

This reuse of the image data saves energy and resources by, for example:

Not re-energizing the scanning beam;
Reducing wear by not moving the mechanical components unnecessarily; and
Using fewer CPU cycles.

Other benefits of the disclosed systems and methods include:

Energy/Resource saving ("green") mode when re-imaging the same document;
Faster output on re-imaging; and
Intelligent image data reuse if a change in imaging options does not require a physical rescan.

Existing solutions do not reuse the image data on a repeated copy/image function based on sensing that the previously scanned document has not been removed from the imaging device.

FIG. 1 illustrates one embodiment of an imaging device 100 for minimizing re-imaging procedures. The disclosed imaging device 100 can perform one or more document scanning operations, such as:

Copying;
Scanning;
Filing;
Faxing; and
Media duplication.

The imaging device 100 may be embodied in a number of different ways and may include an automatic document feeding (ADF) unit 102, platen 104, control panel 106, user prompting component 108, imaging components 110, and outputting components 112.

The ADF unit 102 includes components for feeding one or more sheets of a hard copy 114 of a document through a scanning process. The ADF unit 102 includes a hard copy processing path 116 and one or more sensors 118 positioned throughout the path 116. The processing path 116 is a path through which one or more sheets of the hard copy 114 of a document pass to enable automated scanning of these sheets, i.e., without being required to hand feed each one of the sheets for scanning.

The sensors 118 detect whether a sheet of paper is positioned at some point along the processing path 116. The processing path 116 can include an input tray (in which one or more sheets of paper of a hard copy 114 are stacked before proceeding further through the processing path 116), an output tray where sheets of paper of a hard copy 114 of the document are positioned after the scanning/imaging process has been completed, and/or any number of intermediate positions within the processing path 116.

The platen 104 is an apparatus for receiving a sheet of a hard copy 114 of the document prior to scanning. The platen 104 may include, in one embodiment, a sheet of glass or other material on which a hard copy 114 of the document is positioned during the scanning process. The position immediately adjacent to the platen 104, where a sheet of a hard copy 114 of a document is positioned during the scanning process, may also be considered a processing path 120. One or more sensors 122 within this processing path 120 can determine whether a sheet of the hard copy 114 of the document is on the platen 104.

The sensors 118, 122 may directly detect the presence of a sheet of a hard copy 114 of the document in the processing path 116, 120 or, alternatively, may, for example, determine whether a cover for the platen 104 or imaging device 100 has been opened or moved since a scanning process was last initiated.

The sensors 118, 122 may use, for example, optical (e.g., lasers) or tactile mechanisms for determining whether a hard copy 114 of the document is within the respective processing path 116, 120. Also, the number and position of the sensors 118, 122 may be varied within the scope of the disclosed systems and methods. Whether a platen 104, ADF 102, or both were used, the sensors 118, 122 of the imaging device 100 can detect if the hard copy 114 of a document on the platen 104 or ADF 102 has been removed since a scanning process was last completed.

The imaging device 100 includes a control panel 106 for inputting sets of imaging instructions 126, 128. The imaging instructions 126, 128 may specify, for example, the resolution of the scanned image data 130, the number of copies to be output, the size of output paper or media to be utilized, reduction or enlargement percentages, output location, output tray, input tray, input paper, paper type, etc. Imaging instructions 126, 128 may also be input using a computing device (such as a laptop or desktop computer) in communication with the imaging device 100.

The control panel 106 may include a single button 132, such as a "Copy" or "Scan" button. The single button 132 may be used to initiate a scanning process, such as a copying process based on default or otherwise specified settings for the imaging device 100.

The imaging device 100 may include memory 134. The memory 134 may comprise volatile and/or nonvolatile memory 134. The volatile memory 134 may be embodied as random access memory (RAM) 134. Nonvolatile memory may comprise, for example, a hard disk memory 134 or flash memory 134.

The memory 134 may store image data 130, which comprises data reflecting or indicating an image of a hard copy 114 of a document obtained using imaging components 110. The image data 130 may be stored at an identified location 136. The identified location 136 may utilize any type of addressing system that allows the image data 130 to be accessed at a subsequent time. Such a system may also implement measures to prevent the image data 130 at the identified location 136 from being overwritten, at least for a period of time. The identified location 136 may comprise one or more static or dynamic blocks of memory 134.

The image data 130, in one embodiment, may be retained at the identified location 136 in memory 134 until a purging event 138 occurs. A purging event 138 may comprise, for example, the passage of a specified amount of time or removal of the hard copy 114 from one of the processing paths 116, 120.

The memory 134 may also store sets of imaging instructions 126, 128, such as a first and a second set of imaging instructions 126, 128. In one embodiment, the first set of imaging instructions 126 pertains to an original scan of a hard copy 114 of a document. In such an embodiment, the second set of imaging instructions 128 pertains to a second outputting procedure on the same or a part of the same hard copy 114 of the document without the need to rescan the document by reusing the previously obtained image data 130.

Imaging components 110 include software and hardware to facilitate obtaining an image of a hard copy 114 of the document (i.e., scanning the hard copy 114) for outputting 112. Imaging components 110 could include, for example, a photosensitive drum or belt, corona wires, one or more light sources, charge-coupled device (CCD) arrays, mirrors, filters, lens, etc.

Outputting components 112 include hardware and software of the imaging device 100 to enable printing (including copying) 140, faxing 142, file storage 144 of the scanned imaged, transmission of image data 130 to a network destination 146 for storage, media (e.g., CD or DVDs) duplication 148 or other types of outputting 112. The outputting components 112 could, for example, include toner and a fuser for creating reproductions of a hard copy 114 of a document on a printing medium, such as paper.

Figure 2:
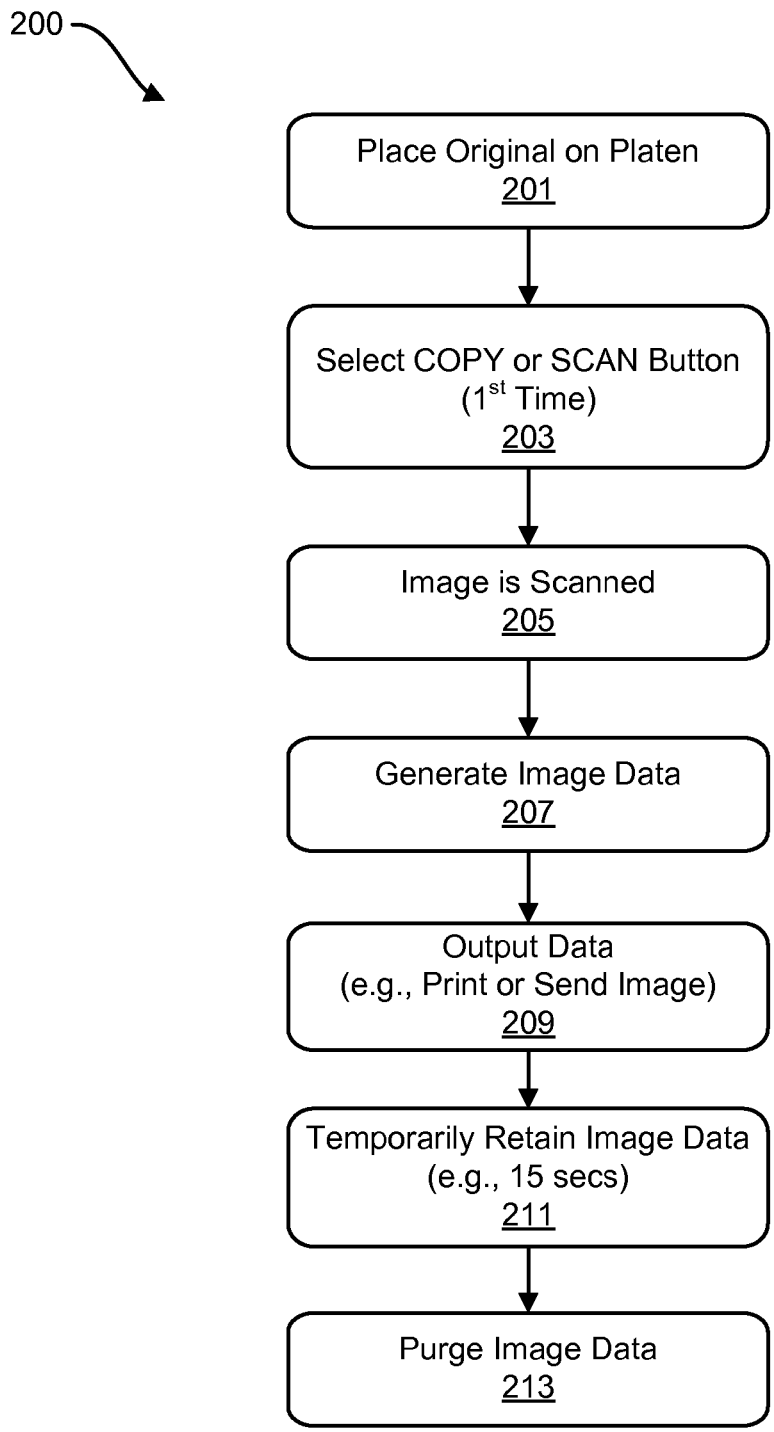
FIG. 2 is a flow diagram illustrating one embodiment of a method for minimizing re-imaging procedures during a first scanning procedure.

FIG. 2 is a flowchart illustrating one embodiment of a method 200 for minimizing re-imaging procedures for an imaging device 100. In one embodiment of the disclosed systems and methods, a user may first scan a single document on a platen 104 or a multi-sheet document on an ADF 102, which may include a RADF (a reversing duplex document feeder). Typically, the user initiates the scan as follows:

1. Selecting an outputting operation (e.g., copy);
2. Selecting input scanning settings;
3. Selecting outputting settings; and
4. Selecting the button to initiate the operation.

As illustrated in FIG. 2, a user may place 201 a hard copy of a document on a scanner platen 104 or an input tray of an ADF 102. The user may then select their preferred scanning and outputting settings, potentially from the control panel 106 of the device 100. The user then initiates the scanning operation, such as by selecting 203 a "Copy" or "Scan" button.

The scanning beam on the imaging device 100 (e.g., a multifunction peripheral (MFP)) is then energized and traced across each sheet of the hard copy 114 of a document to scan or "image" 205 the document. The scanned information is used to generate 207 scanned image data 130, often in an industry standard format, such as TIFF, JPEG, or PNG. The scanned image data 130 is then output 209, such as by:

Filing;
Printing;
Sending to a destination; and
Faxing.

The scanned image data 130 generated from the above operation may be temporarily retained 211 in memory until a purging event 138 occurs. The scanned image data 130 may be temporarily stored in:

Random access memory (RAM);
Flash;
Hard-Drive; and
Removable Storage.

The purging event 138 may comprise, for example:

The expiration of a time period, such as a fixed time period set by a user or by default (e.g., 15 seconds);
Removal of a hard copy 114 of the document from the imaging device 100;
Placing a hard copy 114 of another document on the imaging device 100 for scanning; or A request for the memory in which the image data 130 is stored.

Once a purging event occurs, the scanned image data 130 is purged 213.

Figure 3:
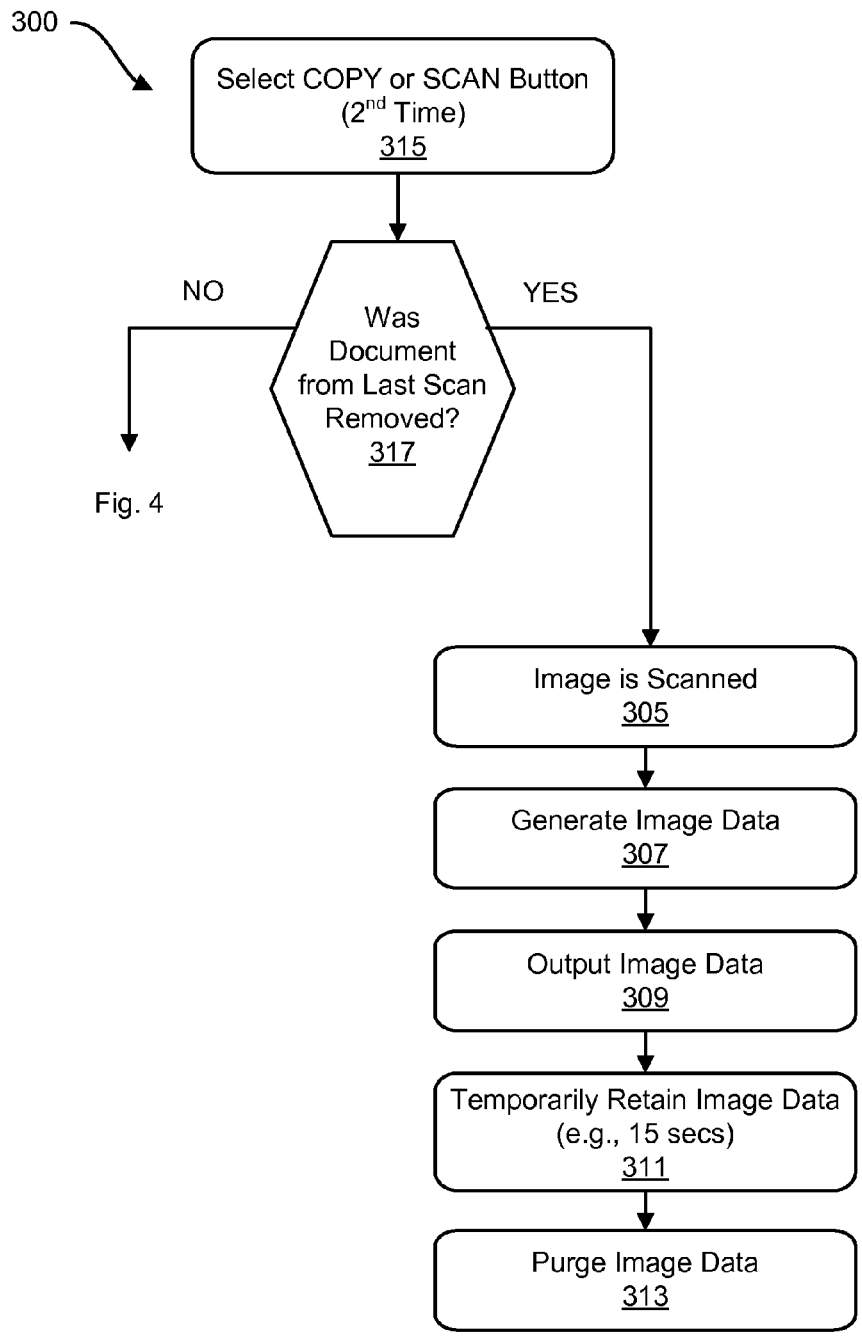
FIG. 3 is a flow diagram illustrating one embodiment of a method for minimizing re-imaging procedures during a second scanning procedure.

FIG. 3 is a flow diagram illustrating one embodiment of a method 300 for minimizing re-imaging procedures. In the embodiment illustrated in FIG. 3, a hard copy 114 of a document has been removed from the imaging device 100 after a first scanning procedure (which is illustrated in FIG. 2). As shown in this FIG. 3, when a user initiates a scanning operation after the first scanning operation has been initiated (such as by pressing the "Copy" or "Scan" button a second time 315), the imaging device 100 attempts to determine 317 if the user is performing a scan operation on the same hard copy 114, i.e., if the document from the last scanning operation has been removed.

It is determined 317 if the user has replaced the hard copy 114 of the document since the last scan. This determination 317 may be performed in a number of different ways. In one embodiment, a sensor 118, 122 is used to determine 317 if the platen 104 cover has been lifted since the last scan. If not, the imaging device 100 determines 317 that the same document is still on the platen 104.

Other types of sensors 118, 122 may be used. For example, the imaging device 100 may sense if the document has been moved from the platen 104 after the platen 104 cover has been lifted. This may be done for example using low energy LED emitters and paired sensors 118, 122 that are activated when the platen 104 cover is lifted. As long as the hard copy 114 of the document remains on the platen 104, the emitting signal is blocked (or reflected). Once the document is moved, the signal is no longer blocked (or reflected).

The ADF 102 may use a paper present (weight) sensor in the ADF 102 document return bin. In one embodiment, if the document has not been removed from the document return bin, and no document is sensed in the ADF 102 input feeder, as well as no document is sensed in the platen 104, then the imaging device 100 determines 317 that the original document in the ADF 102 has not been removed.

If the imaging device 100 determines 317 that the hard copy 114 of the document has been replaced (not the same original) from the last scan, then the imaging device 100 repeats steps described in connection with FIG. 2, i.e., scanning 305, generating 307 image data, outputting 309 the image data 130, retaining 311 the image data 130 in memory 134, and purging 313 the image data 130 when a purging event 138 occurs.

Figure 4:
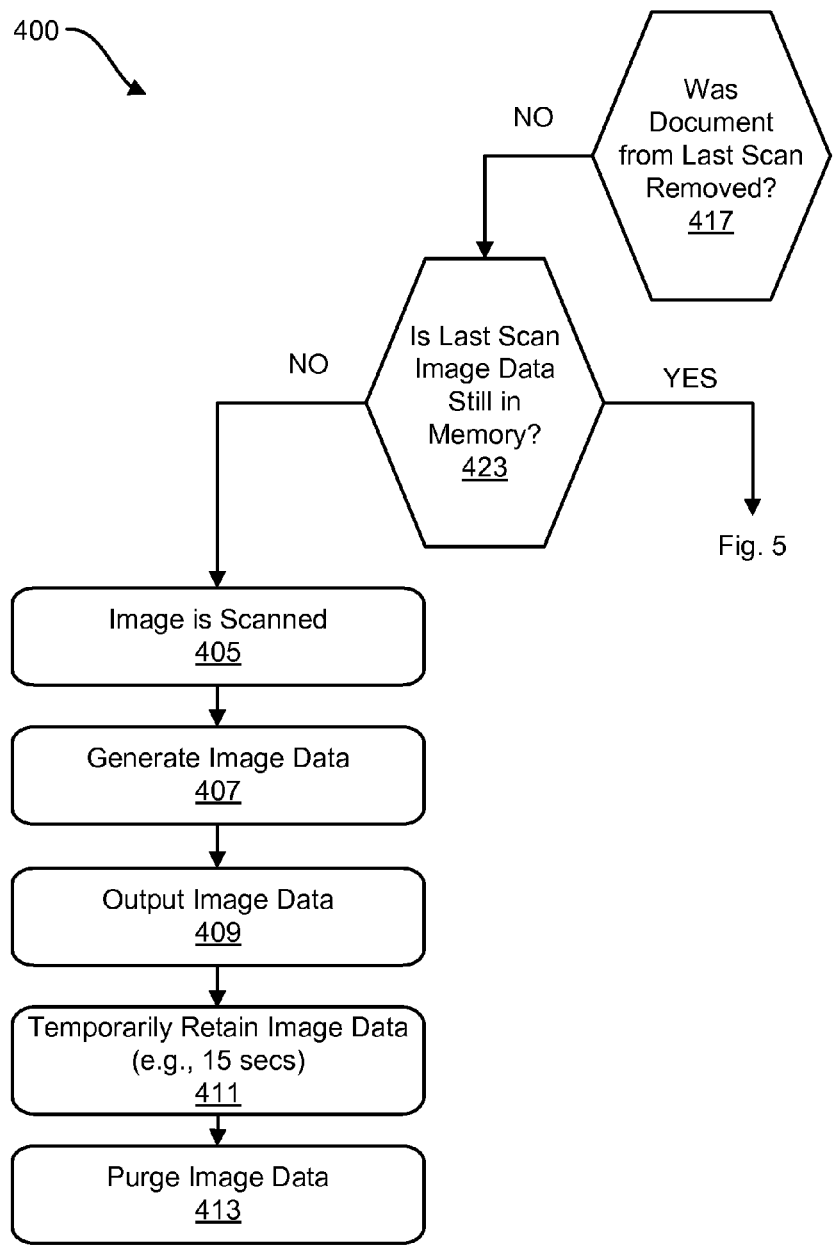
FIG. 4 is a flow diagram illustrating one embodiment of a method for minimizing re-imaging procedures during a second scanning procedure.

FIG. 4 is a flow diagram illustrating a method 400 for minimizing re-imaging procedures. In the illustrated embodiment, a hard copy 114 of a document was not removed from the imaging device 100 since the last scanning procedure, but the related imaging data 130 is no longer in memory 134. As such, in the illustrated embodiment, the imaging device determines 417 that the same hard copy 114 document is present (same original) since the last scan. The imaging device then determines 423 whether the scanned image data 130 from the last scan is still retained at the imaging device 100.

If it is determined 423 that the scanned image data 130 is no longer in the memory 134, then the imaging device 100 repeats the steps described in FIG. 2, namely, scanning 405, generating 407 image data 130, outputting 409 the image data 130, retaining 411 the image data 130 in memory 134, and purging 413 the image data 130 when a purging event 138 occurs.

Figure 5:
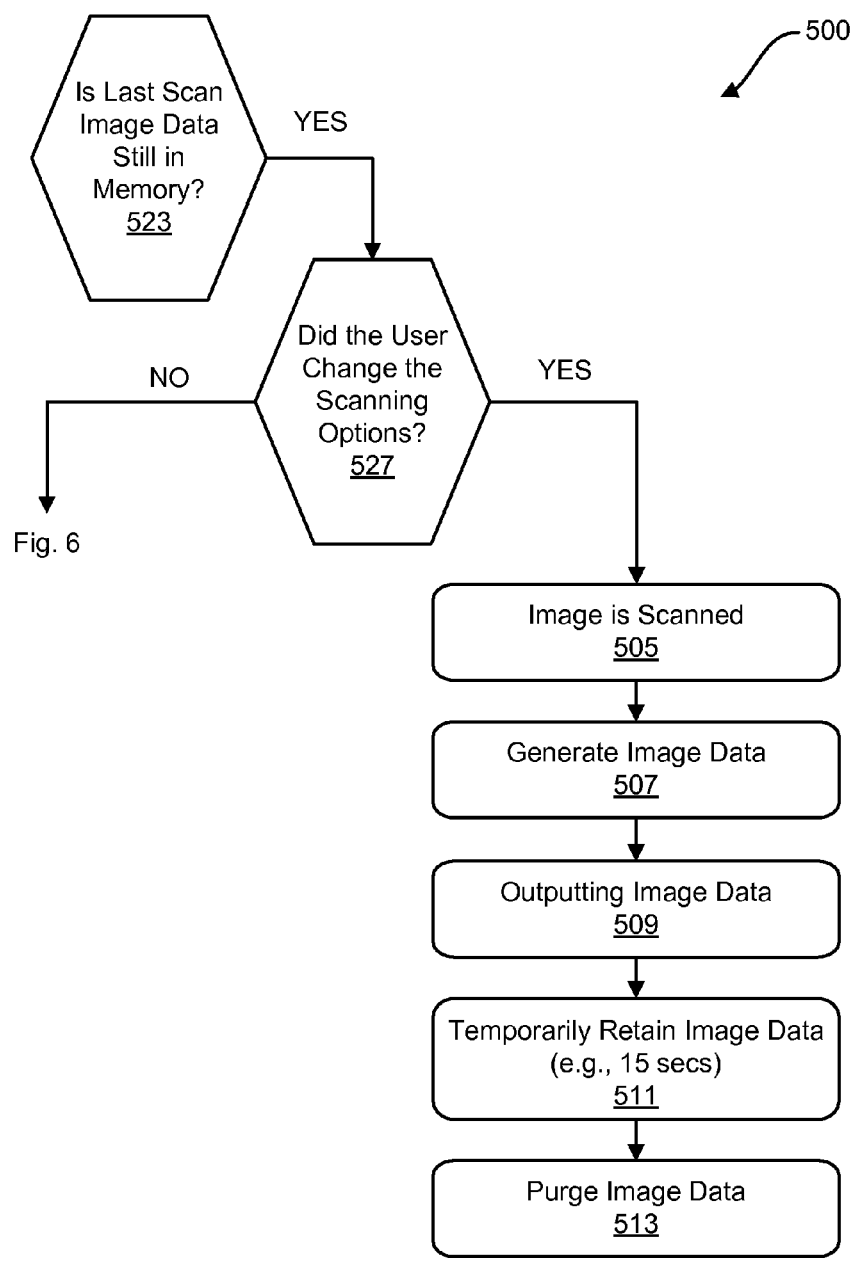
FIG. 5 is a flow diagram illustrating one embodiment of a method for minimizing re-imaging procedures during a second scanning procedure if scanning options have been altered between a first and second scanning procedures.

FIG. 5 is a flow diagram illustrating one embodiment of a method 500 for minimizing re-imaging procedures. In the illustrated embodiment, the imaging device 100 determines 523 that the scanned image data 130 from the last scan has been retained in memory 134. The imaging device 100 then determines 527 if the user has selected a change in scanning preferences such that the previously saved image data 130 cannot be reused. In other words, the second set of imaging instructions 128 require information not present in the scanned data 130 obtained pursuant to the first set of imaging instructions 126.

For example, the user may make the following change to the scanning preferences, which would prevent reuse of the current saved scanned image data:

A switch from black-and-white to color options; and

A switch from lower resolution to higher resolution.

Some changes to the scanning preferences would not prevent reuse of the current saved scanned image data 130, particularly those that can be emulated from the existing saved scanned image data 130:

A switch from color to black-and-white; and

A switch from higher resolution to lower resolution;

Changing the outputting preferences could, in certain circumstances, likewise not prevent reuse of the current saved scanned image data 130, such as:

Changing from one output engine (e.g., copy) to another (e.g., fax); and

Change in outputting layout (e.g., N-up, booklet, etc).

If it is determined 527 that the scanned image data 130 cannot be reused because of the changes in the scanning preferences, then the imaging device 100 repeats the steps described earlier, namely, scanning 505, generating 507 image data 130, outputting 509 the image data 130, retaining 511 the image data 130 in memory 134, and purging 513 the image data 130 when a purging event 138 occurs.

Figure 6:
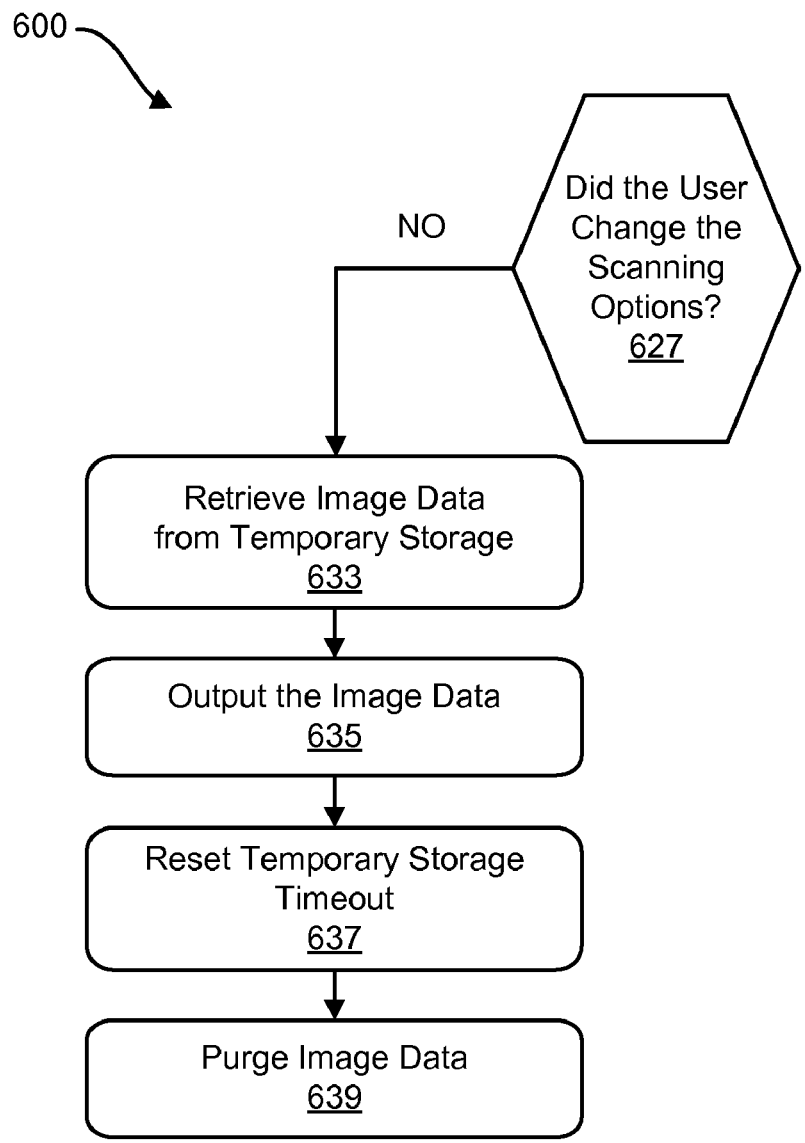
FIG. 6 is a flow diagram illustrating one embodiment of a method for minimizing re-imaging procedures during a second scanning procedure in which previously obtained image data is reused.

FIG. 6 illustrates one embodiment of a method 600 for minimizing re-imaging operations. In the illustrated method, if the imaging device 100 determines 627 (from the above tests) that the saved scanned image data 130 is reusable for the current repeat of the scanning operation, then the imaging device 100 skips the physical rescan of the hard copy 114 document, and does the following:

1. Retrieves 633 the scanned image data 130 from the temporary storage;

2. Outputs 635 the scanned image data 130;

3. Resets 637 the temporary storage (e.g., reset timeout) for the scanned image data 130, and purges 639 the image data when a purging event 138 occurs.

In an alternative embodiment, when it is determined that the hard copy 114 of the document has not been removed and that the scanning options have not been changed so as to prevent reuse of the retained image data 130, the user is prompted to verify that the previously scanned image data 130 should be reused. If so, then the previously scanned image data 130 is used for a second outputting procedure. Otherwise, in such an embodiment, the previously scanned data is not reused and a new scan is initiated.

A user may be prompted for input in various ways. For example, a user interface prompt may be provided by the device 100 in hardware, software and/or a combination of both to prompt a user for input. A display may be used as a user interface prompt. Additionally, buttons on a panel may also be used as a user interface prompt. Through a user interface prompt certain information or input may be requested by the device 100 from the user.

Figure 7:
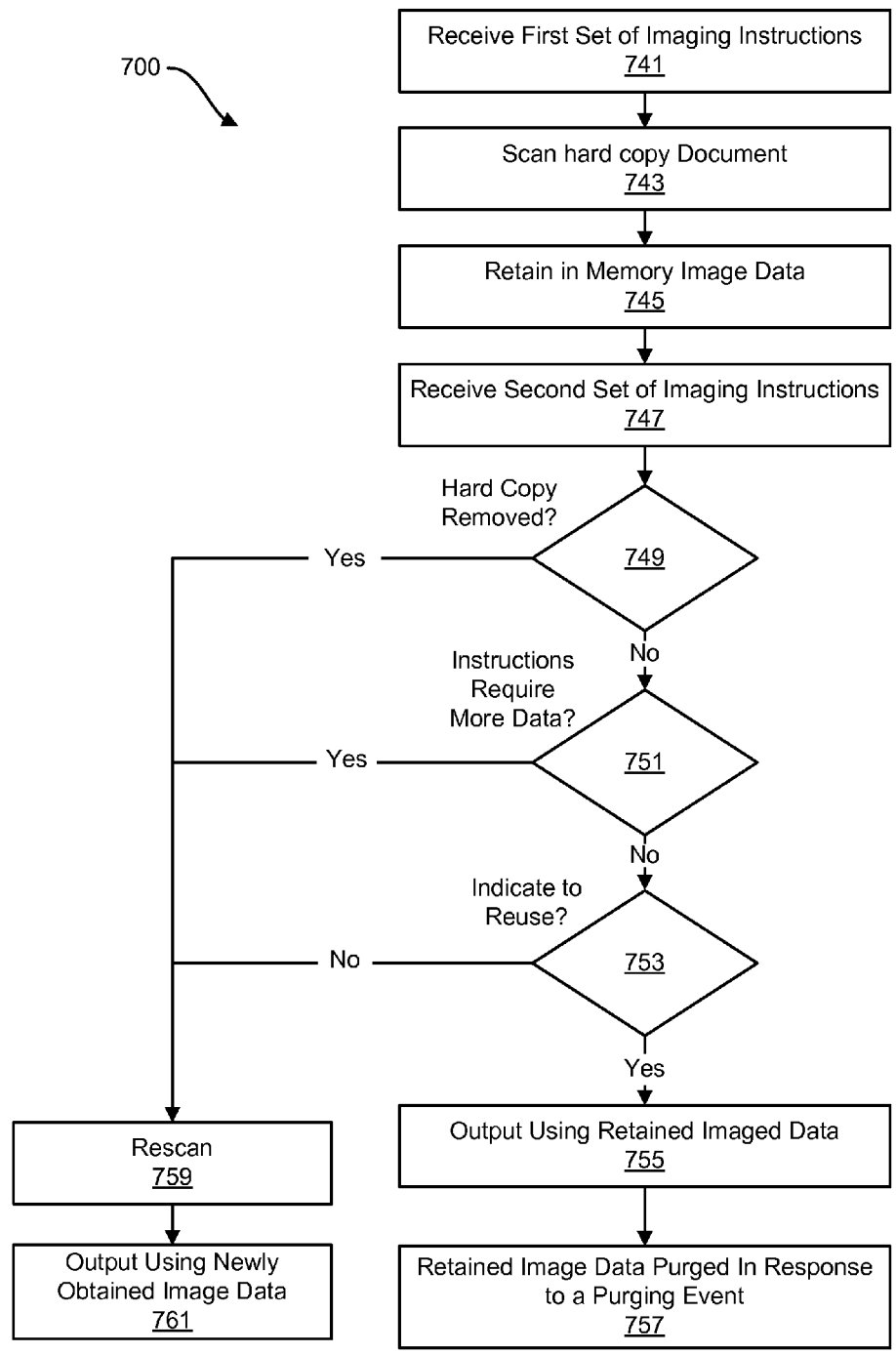
FIG. 7 is a flow diagram illustrating another embodiment of a method for minimizing re-imaging procedures.

FIG. 7 is a flow diagram illustrating one embodiment of a method 700 for minimizing re-imaging procedures for an imaging device 100. A first set of imaging instructions 126 are received 741 at an imaging device 100. The imaging instructions 126 may comprise inputting and outputting instructions.

The inputting and outputting instructions may include, for example, resolution options, duplexing options, black-and-white, gray scale, or color options, reduction or enlargement options, finishing options, sorting options, grouping options, collating options, etc.

A hard copy 114 of a document is scanned 743 (i.e., imaged) in accordance with the first set of instructions 126. The hard copy 114 of the document may include a single sheet or any number of sheets.

Based on the scan, image data 130 is created. The image data 130 comprises data that may be used to display or otherwise output an image of the hard copy 114 of the document.

The image data 130 obtained from the scan is retained 745 at an identified location 136 in memory 134 until a purging event 138 occurs. A purging event 138 could comprise the expiration of a period of time, such as a time period specified by default or in response to user input. As explained previously, a purging event 138 could also comprise removal of a hard copy 114 of the document from a processing path 116, 120 of the imaging device 100, a user request that the image data 130 be purged, a combination of one or more of the foregoing, or other events.

A second set of imaging instructions 128 is received 747 at the imaging device 100. Like the first set of imaging instructions 126, the second set of imaging instructions 128 may specify inputting and outputting options for an imaging procedure or job. The second set of instructions 128 could, in one embodiment, comprise pressing only a single button 132, such as pressing a "Copy" or a "Scan" button to proceed with the scan in accordance with the first set of instructions 126 or based on default options for the imaging device 100. The single button 132 may comprise a portion of a touch screen or a physically discrete button 132. In another embodiment, the second set of instructions 128 comprises pressing multiple buttons or may involve altering multiple settings.

In one embodiment, after receipt of the second set of imaging instructions 128, one or more of the following determinations 749, 751, 753 are made. These determinations 749, 751, 753 may be made in any order, not necessarily the order shown in FIG. 7. Also, in certain embodiments, only one or more of the determinations 749, 751, 753 is made, rather than all of these determinations 749, 751, 753.

As illustrated in FIG. 7, it is first determined 749 if the hard copy 114 of the document for which the first set of instructions 126 were provided was removed from the imaging device 100 (e.g., from the platen 104 or a processing path 116, 120) before the second set of instructions 128 were received.

A determination 749 of whether the hard copy 114 has been removed from the imaging device 100 may be made using a number of sensors 118, 122 present in or proximate to a processing path 116, 120, the platen 104, or a cover of the imaging device 100.

As illustrated in FIG. 7, if it is determined 749 that the hard copy 114 has not been removed, it is then determined 751 whether the second set of instructions 128 require information not found in the retained image data 130. Examples of second sets of instructions 128 that require additional image data 130 include specifying color output when the original scan was in black-and-white, or specifying a higher resolution scan.

If it is determined 751 that the second set of instructions 128 do not require 751 additional data, then a user may be prompted to indicate 753 whether the image data 130 should be used to process the second set of instructions 128. If the user's input indicates 753 that the image data 130 should be used, then the image data 130 is output 755 in accordance with the second set of instructions 128 using the retained image data 130. Thereafter, when a purging event 138 occurs, the retained image data 130 is purged 757.

As illustrated in FIG. 7, if a hard copy 114 has been removed 749 from the imaging device 100, or the instructions require 751 additional data, or if the user input indicates 753 that the retained image data 130 should not be reused, the hard copy 114 is rescanned 759 and output 761 using the newly obtained image data 130 based on the second set of instructions 128.

Figure 8:
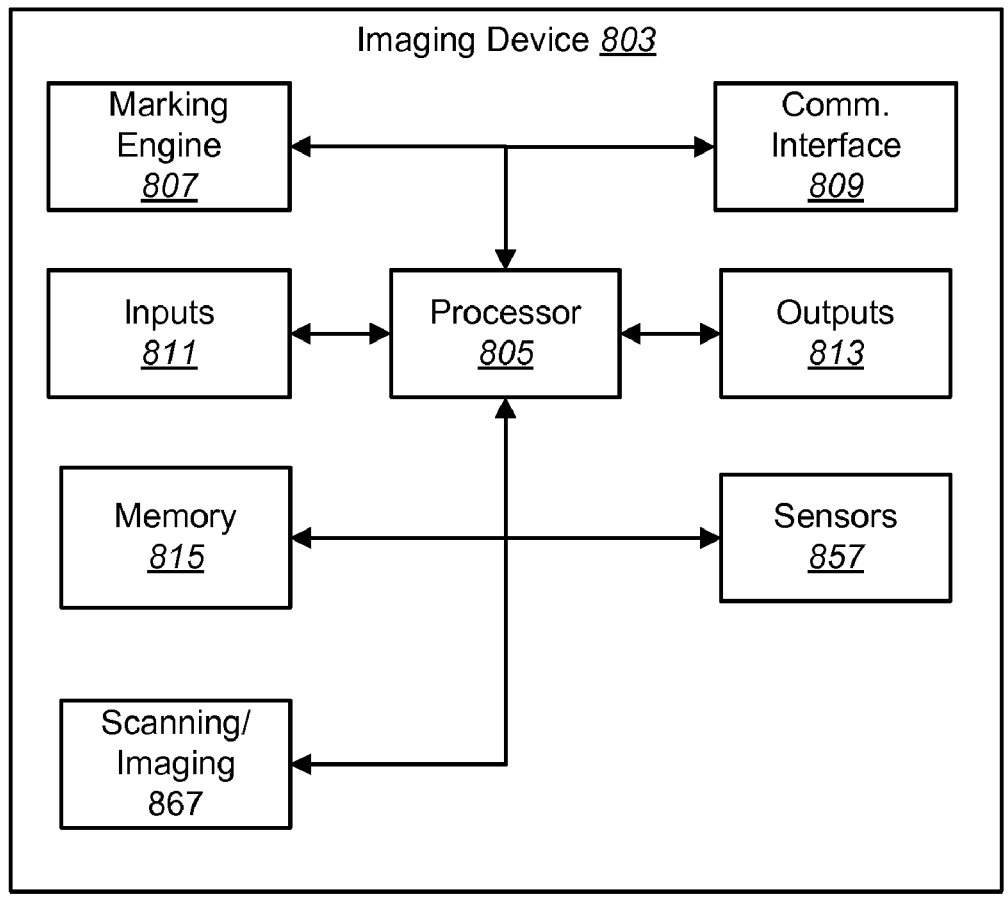
FIG. 8 is a block diagram illustrating the major hardware components that may be used in an imaging device.

FIG. 8 is a block diagram illustrating the major hardware components that may be utilized with embodiments of an imaging device 803. As noted above, an imaging device 803 is a device that creates image data 130 using a hard copy 114 of a document. Imaging devices 803 include, but are not limited to, a multi-function peripheral ("MFP") (e.g., printer/copier/scanner or a printer/copier/fax machine), a scanner, a copier, a digital camera scanner, smart digital whiteboard, and a fax machine. The imaging device 803 may be a single or a plural grouping (e.g., pool or cluster) of two or more devices 803.

An imaging device 803 may include a processor 805 in electronic communication with the various components of the imaging device 803. The processor 805 controls the operation of the imaging device 803 and may be embodied as a microprocessor, a microcontroller, a digital signal processor (DSP) or other device known in the art. The processor 805 may perform logical and arithmetic operations based on program instructions stored within the memory 815.

The imaging device 803 may also include a marking engine 807 in communication with the processor 805. The marking engine 807 comprises the systems and components for creating an image based on received image data 130. For example, if the imaging device 803 includes a printer (e.g., an inkjet, thermal dye sublimation, or laser printer) or a fax machine, the marking engine 807 comprises those components used to mark paper, or another printing medium, with the image specified by the image data 130.

The processor 805 may also be in electronic communication with a communication interface 809. The communication interface 809 may be used for communications with computing devices, servers, other imaging devices 803, etc. Thus, the communication interface 809 of the device 803 may be designed to send signals or messages between the imaging device 803 and other imaging devices 803 or other types of computing devices. The communication interface 809 may be based on wired communication technology, wireless communication technology, or both. Examples of different types of communication interfaces 809 include a serial port, a parallel port, USB, an Ethernet adapter, an IEEE 1394 bus interface, a small computer system (SCSI) bus interface, an infrared (IrDA) communication port, a Bluetooth wireless communication adapter, a wave guided optical interface, and so forth.

The processor 805 may be connected to various input 811 and/or output devices 813 capable of electronic communication with the processor 805, or, in other words, with devices capable of input and/or output in the form of an electrical signal. Embodiments of imaging devices 803 may include the inputs 811, outputs 813 and processor 805 within the same physical structure or in separate housings or structures. Examples of different kinds of input devices 811 include a keypad, keyboard, mouse, microphone, remote control device, button, joystick, trackball, touchpad, touchscreen, lightpen, human gesture interface, etc. Examples of different kinds of output devices 813 include an LCD screen displaying the status or selected features of the imaging device 803 and a speaker.

The imaging device 803 may also include memory 815. The memory 815 may be a separate component from the processor 805, or it may be on-board memory 815 integrated with the processor 805. For example, microcontrollers often include a certain amount of on-board memory. As used herein, the term "memory" 815 includes any type of volatile or nonvolatile storage medium, such as RAM, flash memory, or a hard disk storage device. The volatile memory 815 typically may be read and written to very rapidly, when compared to nonvolatile storage devices. The memory 815 typically stores program instructions and other types of data. The program instructions may be executed by the processor 805 to implement some or all of the methods disclosed herein. The memory 815 may also be used as a queue in which to store incoming image data 130 received by the imaging device 803. Some of the memory 815 may also be provided by a cloud computing storage service.

The imaging device 803 may also include sensors 857 for determining whether a hard copy 114 of a document is still on the imaging device 803, such as on a platen 104 or within one of the processing paths 116, 120 of the imaging device 803. The sensors 857 may use, for example, optical or mechanical mechanisms for sensing whether a hard copy 114 of a document has been removed from the imaging device 803. For example, a sensor 857 could detect whether a cover of the imaging device 803 has been lifted or whether the weight of paper is on the platen 104, or some portion of a hard copy 114 processing path of the imaging device 803.

The imaging device 803 may also include scanning or imaging components 867. The scanning or imaging components 867 may include an a photosensitive drum or belt, corona wires, one or more light sources, charge-coupled device (CCD) arrays, mirrors, filters, lens, etc.

Figure 9:
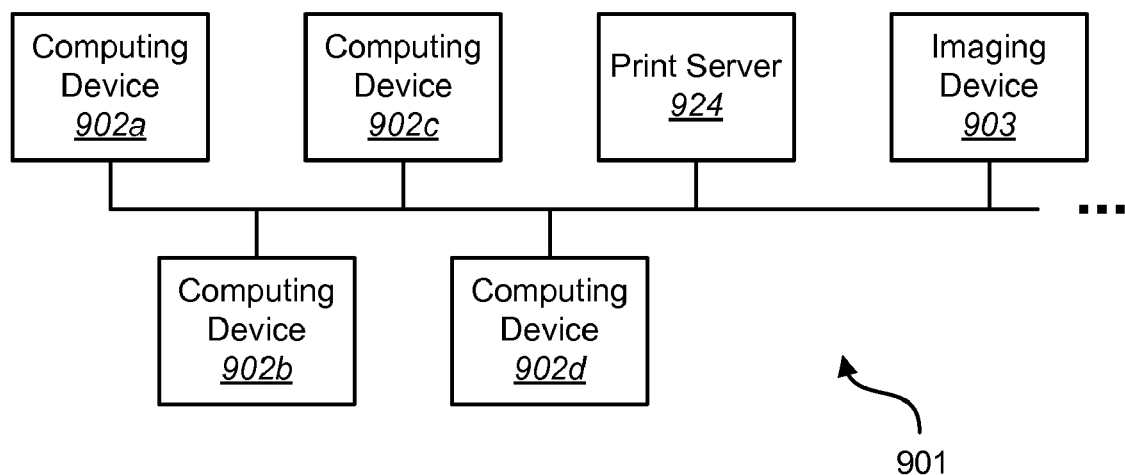
FIG. 9 is a network block diagram illustrating one possible environment in which an imaging device may be used.

FIG. 9 is a network block diagram illustrating one possible environment in which an imaging device 903 may be used. In particular, FIG. 9 illustrates a computer network 901 comprising a plurality of computing devices 902a-d, a print server 924, and an imaging device 903.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described above without departing from the scope of the claims.

What is claimed is:

1. A method for minimizing re-imaging procedures for an imaging device, comprising:
   receiving a first set of imaging instructions for a hard copy of a document at an imaging device;
   scanning the hard copy of the document in accordance with the first set of imaging instructions to create image data;
   retaining in memory the image data at an identified location until a purging event occurs;
   receiving a second set of imaging instructions at the imaging device;
   determining whether the hard copy of the document has been removed from a hard copy processing path of the imaging device since the scanning occurred using at least one sensor;
   producing imaging output in accordance with the second set of imaging instructions using the image data without rescanning the hard copy of the document based on the determination of whether the hard copy of the document has been removed from the hard copy processing path;
   determining whether the second set of imaging instructions requires information not present in the image data; and
   rescanning the hard copy of the document in accordance with the second set of imaging instructions if the second set of imaging instructions requires image information not present in the image data.

2. The method of claim 1, further comprising providing a user interface prompt to request an indication as to whether the image data should be used to process the second set of imaging instructions only if it is determined that the hard copy of the document has not been removed from the hard copy processing path of the imaging device since the scanning occurred.

3. The method of claim 1, further comprising providing a user interface prompt to request an indication as to whether the image data should be used to process the second set of imaging instructions only if it is determined that the hard copy of the document has not been removed from the hard copy processing path of the imaging device since the scanning occurred and that the second set of imaging instructions does not require information not present in the imaging data.

4. An imaging device for minimizing re-imaging procedures for an imaging device, the imaging device comprising:
   a processor;
   memory in electronic communication with the processor;
   instructions stored in the memory, the instructions being executable to:
      receive a first set of imaging instructions for a hard copy of a document at an imaging device;
      scan the hard copy of the document in accordance with the first set of imaging instructions to create image data;
      retain in memory the image data at an identified location until a purging event occurs;
      receive a second set of imaging instructions at the imaging device;
      determine whether the hard copy of the document has been removed from a hard copy processing path of the imaging device since the scanning occurred using at least one sensor;
      produce imaging output in accordance with the second set of imaging instructions using the image data without rescanning the hard copy of the document based on the determination of whether the hard copy of the document has been removed from the hard copy processing path;
      determine whether the second set of imaging instructions requires information not present in the image data; and
      rescan the hard copy of the document in accordance with the second set of imaging instructions if the second set of imaging instructions requires image information not present in the image data.

5. A non-transitory computer-readable storage medium providing for minimizing re-imaging procedures for an imaging device, the computer-readable medium comprising instructions executable to:
   receive a first set of imaging instructions for a hard copy of a document at an imaging device;
   scan the hard copy of the document in accordance with the first set of imaging instructions to create image data;
   retain in memory the image data at an identified location until a purging event occurs;
   receive a second set of imaging instructions at the imaging device;
   determine whether the hard copy of the document has been removed from a hard copy processing path of the imaging device since the scanning occurred using a sensor;
   produce imaging output in accordance with the second set of imaging instructions using the image data without rescanning the hard copy of the document based on the determination of whether the hard copy of the document has been removed from the hard copy processing path;
   determine whether the second set of imaging instructions requires information not present in the image data; and
   rescan the hard copy of the document in accordance with the second set of imaging instructions if the second set of imaging instructions requires image information not present in the image data.

* * * * *